United States Patent Office 3,340,064
Patented Sept. 5, 1967

3,340,064
SILVER HALIDE EMULSIONS SENSITIZED WITH CYANINE DYES CONTAINING AN OXAZINE-TYPE RING
Oskar Riester, Leverkusen, Germany, assignor to Agfa Aktiengesellschaft, Leverkusen, Germany, a corporation of Germany
Filed July 13, 1964, Ser. No. 382,032
Claims priority, application Germany, July 22, 1963, A 43,644
6 Claims. (Cl. 96—106)

This invention relates to cyanine dyes and methods for making them. More particularly, this invention relates to cyanine dyes having oxazine type groupings and photographic emulsions containing the new dyes.

It is an object of the invention to provide methods for making these cyanine dyes. Another object is to provide intermediates for preparing these sensitizing dyes as well as a method for producing these intermediates. Another object is to provide photographic emulsions optically sensitized with these cyanine dyes. Other objects will become apparent from a consideration of the following description and examples.

The sensitizing dyes of the present invention are represented by the following general formulae:

I 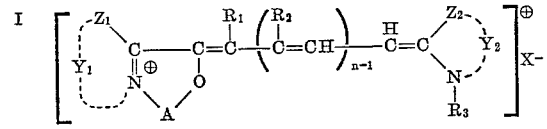

II 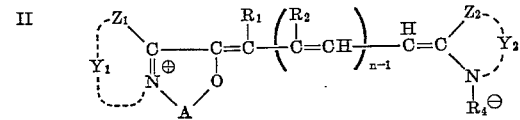

III 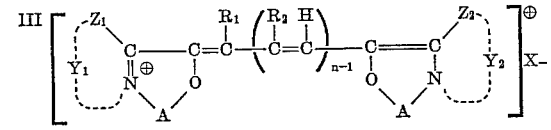

wherein $R_1$ and $R_2$ each stand for hydrogen or a lower aliphatic alkyl, preferably up to 3 carbon atoms such as methyl or ethyl;

$R_3$ is an alkyl group preferably up to 5 carbon atoms, such as methyl, ethyl, propyl, butyl, amyl, $R_4$ is an alkyl group having up to 5 carbon atoms substituted with a carboxy or sulfo-group $X^-$ represents an anion such as chloride, perchlorate, thiocyanate, benzene sulfonate, p-toluene sulfonate, methyl sulfonate, ethylsulfonate etc.; the chemical nature of the anion is not critical and can be selected according to the requirements of the method of the preparation of the dye;

A represents a bivalent organic radical, particularly a bivalent aliphatic radical having 1–3 carbon atoms preferably an ethylene group which may be substituted by lower alkyl, preferably up to 5 carbon atoms, such as methyl or ethyl or dimethyl.

$Z_1$ and $Z_2$ each represent bivalent oxygen, sulfur or selenium;

$n$ stands for a positive integer of from 1 to 3, and $Y_1$ and $Y_2$ each represent the non-metallic atoms necessary to complete a 5-membered heterocyclic ring which may contain an anellated aryl ring, such as phenyl or naphthyl; suitable are those heterocyclic ring which are usual in the cyanine chemistry, such as heterocyclic rings of the thiazole series (e.g., thiazole or methyl- or phenyl thiazole), a ring of the benzthiazole series or of the naphthothiazole series, a ring of the oxazole series, benzoxazole- or naphthooxazole series, a ring of the selenazole-, benzselenazole- or naphthoselenazole series or a ring of the thiazoline series.

According to the invention compounds of the following general formula

III 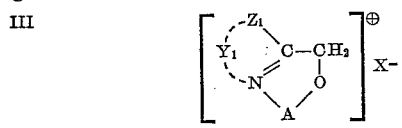

are used as starting materials for the production of the above new cyanine dyes, in which $Z_1$, $Y_1$, A and $X^-$ have the meanings defined above.

The quaternary salts of the above Formula III have a reactive methylene group in the β-position to the nitrogen atom and can, therefore, be reacted to form cyanine dyes by methods used in cyanine chemistry.

These quaternary salts can be obtained from azoles, such as those of the benzthiazole series or benzselenazole series, typical of those used in cyanine chemistry and which are substituted by a hydroalkoxymethyl group in the 2-position, by ring closure at high temperatures, if desired, after previous esterification of the hydroxy group, in the presence of acids, which may be split off from the ester group.

These reactions proceed as shown in the following equation:

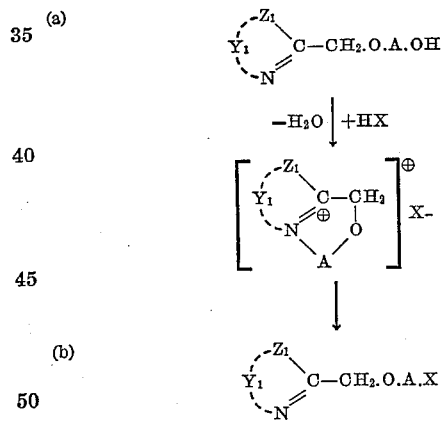

where Z, $Y_1$, $X^-$ and A have the same meaning as in the above formulae.

Examples of acids which can be used in the reaction shown in Equation a are more especially organic sulfonic acids, such as benzene sulphonic acid, p-toluene sulphonic acid, alkyl sulfonic acids, having preferably up to 3 carbon atoms, as well as mineral acids such as phosphoric acid and sulfuric acid. The temperature used in ring closure are 70–200° C. preferably 140-200° C. The reaction shown in the above Equation b generally requires lower temperatures, preferably 80–120° C.

For the preparation of the sensitizing dyes of the general Formulae I and II the quaternary salt of Formula III is condensed in accordance with methods well known in the cyanine chemistry with compound containing a reactive methylene or methine group. Suitable compounds are, for example:

(1) Ortho-esters of the general formula $(R_5O)_3CR_1$ wherein $R_1$ has the values given above and $R_5$ represents a lower alkyl group such as methyl or ethyl. Suitable compounds are ethyl ortho-formate, ethyl ortho-acetate or ethyl ortho-propionate. This method is described in German Patent No. 410,487 and the publication by F. M. Hamer in the J. Chem. Soc., London, 1928, page 3160 and 1927, page 2796.

(2) Ortho-thioester of the formula $(R_5S)_3CR_1$ wherein $R_1$ and $R_5$ have the values given above. Suitable compounds are ethyl trithioformate, ethyl trithioacetate, ethyl trithiopropionate. This method is described in Austrian Patent No. 149,348.

(3) Amidoalkylether chlorhydrates of the formula

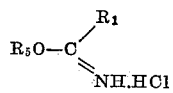

in which $R_1$ and $R_5$ have the meaning given above. Suitable compounds are ethylformiminoether hydrochloride or ethylacetiminoether hydrochloride.

(4) For the preparation of unsymmetrical cyanines there is particularly suitable diphenylformamidine or a vinyl-homolog thereof

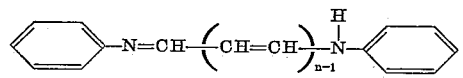

It is self-explanatory that for the production of unsymmetrical cyanine dyes two different cyclammonium quaternary salts have to be considered with one of the above agents.

As to the preparation of cyanine dyes reference is made to the publications of J. Götze and H. Socher in "Beihefte zur angewandten Chemie" volume 40, (1940) pages 1–16. In the following examples concerned with the production of cyanine dyes of the present invention, a number of such dyes are separately described:

Example 1

The dye of the formula:

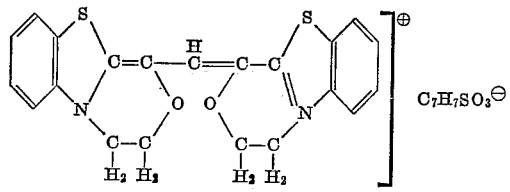

is obtained as follows:

4.2 g. of 2-(hydroxyethoxy)-benzthiazole and 3.5 g. of p-toluenesulfonic acid are heated for 30 minutes to 160° C. After cooling to 60° C., 10 ml. of pyridine and 15 ml. of orthoformic acid ethyl ester are added and heated for 15 minutes to boiling point. The dye crystallizes out and is suction-filtered. Yield: 1.1 g. The solution of the dye in methanol is blue, abs. max. at 632 mμ, M.P. 286° C.

The 2 - (hydroxyethyoxymethyl) - benzthiazole is obtained as follows:

15 g. of potassium hydroxide are dissolved in 257 ml. of ethylene glycol, 39.5 g. of 2-chloromethylbenzthiazole are added slowly at 20° C. and the mixture is heated for 3 hours in an oil bath to 170–180° C. After cooling, it is poured into 400 ml. of water and the product is extracted by shaking with chloroform. After distilling off the solvent, the residue is fractionated. B.P. 184–186° C. at 4.5 mm. Hg. M.P. 45–47° C. Yield 27 g.

If 30 g. of potassium fluoride are used instead of the potassium hydroxide in the above mixture, then using the same procedure, a fraction is obtained with B.P. 173–174° C. at 3 mm. Hg. Yield 14.4 g. The product is identical with that described above.

Example 2

The dye of the formula:

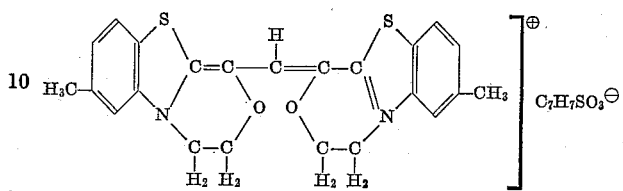

is obtained as follows:

(a) 10 g. of 2-(hydroxyethoxymethyl)-5-methylbenzthiazone are dissolved in 10 ml. of pyridine. To this solution, 11 g. of p-toluenesulphochloride are slowly added at 10° C. The mixture is then stirred for ½ hour at 10° C. and then for 4 hours at 20° C. The reaction mixture is triturated with 50 ml. of water, the water is decanted and the residue taken up in ether. This solution is dried with sodium sulfate and the ether distilled off at 20° C. Yield: 6.4 g., M.P. 63–64° C. By heating slowly for 20 minutes on a steam bath, this ester undergoes intramolecular ring closure to form the quaternary salt. After adding 40 ml. of pyridine and 10 ml. of orthoformic acid ethyl ester, heating is continued for another 20 minutes. The blue dyestuff which is formed is suction-filtered after cooling and recrystallised from a mixture of 100 ml. of methanol and 50 ml. of chloroform. Yield 1.9 g., M.P. 292–294° C. Another 0.6 g., M.P. 290–293° C., is obtained from the mother liquid.

The solution of the dye in methanol is blue and the abs. max. is at 638 mμ.

*Shortened method of preparation.*—2.2 g. of 2-(hydoxyethyloxymethyl)-5-methyl-benzthiazole and 2.7 g. of p-toluenesulfonic acid are heated for 30 minutes to 160° C. After cooling, 10 ml. of pyridine and 8 ml. of orthoformic acid ethyl ester are added and the mixture heated for 10 minutes to boiling point while stirring. The dye precipitated after cooling is suction-filtered and washed with propanol. Yield: 0.4 g., M.P. 289–292° C. The solution of the dye in methanol has the same color and the same absorption maximum and sensitizing maximum as the product obtained by the procedure described above.

The 2 - (hydroxyethyloxymethyl)-5-methylbenzthiazole required for the foregoing syntheses is prepared as follows:

15 g. of sodium hydroxide are dissolved in 250 ml. of ethylene glycol. 39.4 g. of 2-chloromethyl-5-methylbenzthiazole are added in portions while stirring. After heating for 3 hours at 180° C., the cooled solution is poured into 400 ml. of water. The product is separated by extraction by shaking with chloroform. After drying, the chloroform is distilled off and the residue distilled under reduced pressure. B.P. 167–178° C., at 1 mm. Hg. Yield. 34.5 g., M.P. 46–47° C.

The 2-chloromethyl-5-methylbenzthiazole is obtained as follows:

14 g. of 2-mercapto-5-methyl aniline are mixed with 10 g. of monochloroacetic acid and introduced into 67 g. of polyphosphoric acid at 70° C. The mixture is thereafter heated for another hour at 150° C. in an oil bath. After cooling, 100 ml. of water are added and the reaction mass is dissolved by stirring. The solution is extracted by shaking with benzene and the benzene extract is thoroughly dried. After distilling off the benzene, the residue is distilled at 2 mm. B.P. 124° C, at 2 mm. Hg. Yield: 11.5 g., M.P. 48–50° C.

(b) If the orthoformic acid ethyl ester of procedure (a) is replaced by the orthoacetic acid ester, there is obtained the corresponding meso-methyl-cyanine dyestuff, which is isolated by precipitation with 5 ml. of 25% potassium iodide solution. After recrystallisation from methanol-chloroform, there are obtained 0.3 g. of a blue dyestuff, M.P. 220–222° C.

(c) The corresponding meso-ethyl dyestuff is obtained by heating with orthopropionic acid ester at 60° C. for 40 minutes. It is precipitated as iodide and recrystallised. Yield: 0.2 g., M.P. 172–177° C.

*Example 3*

The dye of the formula:

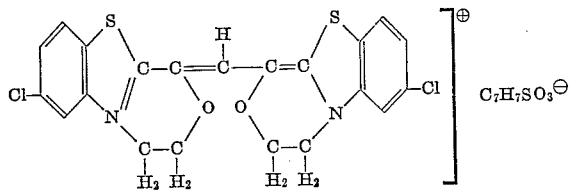

is obtained as follows:

2.4 g. of 2-(hydroxyethoxymethyl) - 5 - chloro-benzthiazole and 1.8 g. of p-toluenesulfonic acid are heated for 30 minutes to 160° C. After cooling 20 ml. of pyridine and 6 ml. of orthoformic acid ethylester are added and heated for 15 minutes while stirring at boiling point. The dye is suction-filtered after cooling. Yield: 0.2 g., M.P. 289–297° C.

The benzthiazole derivative serving as starting product is prepared as follows:

5 g. of potassium hydroxide are dissolved in 90 ml. of ethylene glycol. 13 g. of 2-chloromethyl-5-chlorobenzthiazole are introduced at 20° C. while stirring, whereupon the mixture is heated for 3 hours at 170° C. After cooling, the melt is poured into 300 ml. of water and extracted with chloroform. The chloroform extract is thoroughly shaken with 25 ml. of diluted sodium hydroxide solution and then dried with sodium sulfate. After distilling off, it is fractionated as quickly as possible. B.P. 160–167° C., at 1 mm. Hg. Yield: 4.5 g.

*Example 4*

The dye of the formula:

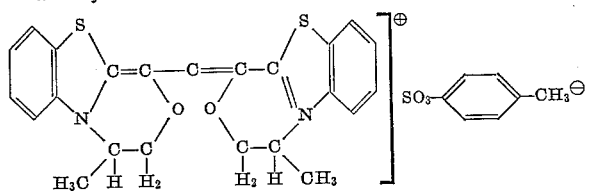

is prepared as follows:

4.8 g. of 2-[(2'-hydroxy-propoxymethyl)-p-toluene-sulfonic acid ester]-benzthiazole are heated for 10 minutes to 180° C. After cooling, 10 ml. of pyridine and 5 ml. of orthoformic acid ethyl ester are added and heated for another 5 minutes while stirring at boiling point. The dyestuff precipitated on cooling is suction-filtered and washed with n-propanol. Yield: 0.2 g., M.P. 183–189° C.

The starting product is prepared as follows:

7.5 g. of potassium hydroxide are dissolved while heating in 50 ml. of propane-1,2-diol. 20 g. of 2-chloromethyl-benzthiazole are added at 110° C., and the mixture heated for 3 hours at 170–180° C. The cooled mixture is poured into 400 ml. of water and the product extracted with chloroform. After distilling off the solvent, the residue is fractionated; B.P. 181° C., at 1 mm. Hg. 9 g. of this 2-(2'-hydroxy-propoxymethyl)-benzthiazole are dissolved in 10 ml. of pyridine and 9 g. of p-toluene-sulfochloride are introduced at 10° C. After standing for 12 hours at 20° C., 100 ml. of water are added and the mixture extracted by shaking with 100 ml. of chloroform. The chloroform is dried with sodium sulfate and concentrated by evaporation at 50° C. under reduced pressure. Yield: 7.8 g., M.P. 67° C.

The dyes of the present invention are suitable for dyeing textiles. They are, however, particularly useful in manufacturing silver halide emulsions serving to alter the spectral sensitivity thereof. The dyes are sensitizers of high intensity. They are particularly advantageous since they show a highly selective sensitization due to a sharp decay of their sensitization maximum towards the region of longer wavelength as well as towards the region of shorter wavelength. For this reason our new dyes are particularly suitable for use in color photographic silver halide emulsion layers. In a layer of a color photographic material, whether it be copying material or exposure material the sensitization maximum is generally so located that is coincides with the absorption maximum of the dye of the corresponding negative layer. This condition is very satisfactorily fulfilled with the present sensitizing dyes, particularly because these sensitizers are effective in the presence of water-soluble or emulsified color couplers, wetting agents, hardening agents and other conventional additives, without any damage to the effectiveness of the sensitization.

Spectral sensitization by means of our new sensitizers is directed primarily to common silver halide gelatine emulsions. The dyes can be added to the emulsion before, during or after the chemical ripening. They are advantageously incorporated into the finished emulsions. In the preparation of photographic emulsions containing our new dyes it is only necessary to uniformly distribute the compounds throughout the emulsion. The method of incorporating dyes in emulsions are well known to those skilled in the art of emulsion making. It is convenient to add the dyes from solution in appropriate solvents. The solvents must be compatible with the silver halide emulsion and free from any deleterious effect on the photographic properties of the light-sensitive material. The sensitizers can be dissolved in water or a solvent miscible with water or a mixture of water and water miscible solvents. Methanol has proven satisfactory as a solvent for the majority of the sensitizers of the present invention.

The concentration of the sensitizers in the emulsions can vary widely from about 5 to about 100 mg. per kg. of emulsion. The optimum amount can be determined for any particular emulsion by running a series of comparison tests in which the quantity of the sensitizers is varied over a given range. The degree of sensitization can be measured by usual methods which are well known by those skilled in the art of emulsion making. Generally the quantity to be added is substantially lower than usually necessary with other trimethincyanine dyes.

Photographic silver halide emulsions which can be sensitized by means of the dyes of the present invention comprise silver chloride and silver bromide emulsions or mixtures thereof which may also contain a small amount of silver iodide of up to 5 mol percent.

Photographic silver halide emulsions which contain the spectral sensitizers of the invention can also be chemically sensitized by any of the known procedures. They can be sensitized, for example, with sulfur compounds as referred to e.g., in the book, "The Theory of the Photographic Process," by Mees (1954), pages 149–161.

The emulsions can also be chemically sensitized with salts of noble metal such as gold, ruthenium, rhodium, palladium, iridium and platinum, which are used in amounts below that which produce any substantial fog. Representative compounds are ammonium chloropalladate, potassium chloroplatinate, potassium chloroaurate, potassium aurithiocyanate, potassium chloroaurate, auric trichloride and the like. The emulsions can be sensitized with reducing agents, stannous salts or polyamines and the like.

The emulsions can also be stabilized with any of the known stabilizers, such as mercury compounds or azaindenes as described, for example, by Birr in "Z. wiss. phot.," vol. 47 (1952) pages 2 to 28. Particularly suitable, however, are heterocyclic compounds which contain mercapto groups. With such stabilizers the sensitizing effect is unexpectedly improved. The behaviour is quite novel since normally the photographic sensitivity is reduced by the addition of stabilizers. Particularly effective are stabilizers of the 2-mercapto-naphthooxazole series, the 2-mercapto-benzoxazole series, the 2-mercapto-benzthiazol series, the 2-mercapto-selenazole series, the 2-mercapto-benzimidazole series, the 2-mercaptotetrazole series, the 2-mercaptotriazole series, the 2-mercapto-napthooxazine series, the 2-mercapto-thiodiazole series and the 2-mercapto-quinoxaline series. Particular utility exhibit the following compounds:

Sodium-2-mercapto-4,5-benzobenzoxazole-6-sulfonate
Sodium-2-mercapto-naphtho-1',8':4,6-oxazine-3'-sulfonate
Sodium-2-mercapto-naphtho-3',2':4,5-oxazole-7'-sulfonate
Sodium-2-mercapto-5-chlorbenzoxazole-7-sulfonate
2-mercapto-benzoxazole-7-carboxylic acid
2-mercapto-5,6-benzobenzoxazole
2-mercapto-5-phenyl-benzoxazole
2-mercapto-5-chlor-benzoxazole
2-mercapto-benzthiazole
Barium-2-mercapto-benzthiazole-6-sulfonate
2-mercapto-5-(p-chlorphenylamino-sulfone)-benzthiazole
2-mercapto-benzselenazole
2-mercapto-4-phenylthiodiazol-5-thione
2-mercapto-methylbenzimidazole
1-methyl-2-mercapto-5,6-dichlorbenzimidazole
1-methyl-2-mercapto-5-(phenylmethylaminosulfone)-benzimidazole
2-mercapto-3-methyl-3,4-dihydroquinoxaline
1-phenyl-2-mercapto-tetrazole.

In general we have found that from about 0.1 to about 10 g. of the above stabilizing compounds per mol of silver halide can be employed.

The silver halide emulsions layers may contain any suitable film-forming and water permeable colloid as binding agent, such as gelatin which can be replaced partially with products like alginic acid and derivatives thereof such as salts preferably with alkali metals, esters with lower aliphatic alcohols or amides, furthermore, polyvinyl alcohol, polyvinyl pyrrolidone starch, carboxymethyl cellulose and the like.

Manufacture of photographic emulsions and photographic materials which contain the sensitizers of the present invention are described in the following examples:

Example 5

A methanolic solution of 9 mg. of the dye according to Example 1 is added to 1 kg. of a silver chlorobromide gelatin emulsion before after-ripening. After being after-ripened for 20 minutes at 380° C., 10 g. of a cyan color coupler, for example, sodium-1-hydroxynaphthalene-2-(N-stearylcarboxylic acid amide)-4-sulfonate in the form of a 5% aqueous solution is added while stirring.

The above emulsion is coated onto a sheet-like paper support in the usual manner. The dried layer shows a spectral sensitivity in the deep red region with a sensitization maximum at 680 millimicrons. The sensitization curve is much less unsymmetrical than, for example, that which is produced with a rhodacyanine dye of the following formula:

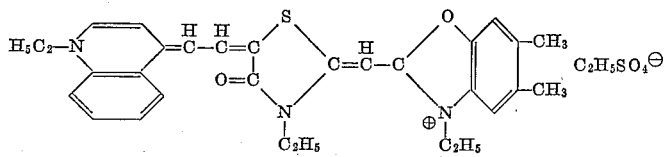

Particularly remarkable is the sharp decay of the sensitizing maximum towards longer and shorter wavelength.

By further addition of a methanolic solution of 300 mg. of sodium 2-mercapto-4,5-benzobenzoxazole-6-sulfonate to the above emulsion, the sensitivity is increased to about twice the value, with a concomitant considerable reduction of the fogging. The same improvement is produced by adding the same quantity of sodium-2-mercapto-1',8'-naphthoxazine-4,6,3'-sulfonate or sodium-2-mercapto-5-chlorobenzoxazole-7-sulfonate.

Example 6

10 mg. of the dye prepared as described in Example 2(a) are dissolved in methanol and added to 1 kg. of a silver chlorobromide gelatine emulsion. The color coupler described in Example 5, a wetting agent such as saponine (30 ml. of a 7.5% aqueous solution of saponine) and a hardening agent, for example, one of those described in German Patent No. 872,153 are also added. A layer produced with these additives shows very good sensitization with a maximum at about 688 millimicrons.

If 200 mg. of 2-mercapto-4-phenylthiodiazole-5-thione is further added to the emulsion, the sensitivity is increased by 125%. The form of the sensitization curve is substantially symmetrical and there is only an indication of a short-wave maximum.

Example 7

A photographic silver halide gelatine emulsion which contains 10 mg. of the dye prepared as in Example 2(b) is produced as described in Example 6. The resulting light-sensitive layer shows a sensitization maximum at about 692 millimicrons with a sharp decay towards longer and shorter wavelengths.

Example 8

A photographic silver halide gelatine emulsion which contains 10 mg. of the dye of Example 2(c) is produced as described in Example 6.

The resulting light-sensitive layer shows a sensitization maximum at 686 millimicrons with a sharp decay towards longer and shorter wavelengths.

Example 9

A photographic silver halide gelatine emulsion which contains 10 mg. of the dye of Example 3 are prepared as described in Example 6.

The resulting light-sensitive layer shows a sensitization maximum at 674 millimicrons with a sharp decay towards longer and shorter wavelengths.

By adding 100 mg. of 2-mercapto-4-phenylthiodiazole-5-thione, the sensitization intensity is increased by 100% and the sensitization maximum is shifted to about 680 millimicrons. If 100 mg. of sodium-2-mercapto-4,5-benzobenzoxazole-6-sulfonate are also added, the rise in the sensitization intensity is a further 100% and the maximum of sensitivity is at about 663 millimicrons. In all cases, the form of the sensitization curve is much more symmetrical with a sharp decay towards longer and shorter wavelengths than when other sensitizers are used.

Example 10

A photographic silver halide emulsion which contains 12 mg. of the dye of Example 4 is produced as described in Example 6.

The resulting light-sensitive layer shows a sensitization maximum at 681 millimicrons with a sharp decay towards longer and shorter wavelengths.

If 300 mg. of sodium-2-mercapto-(1',8'-naphthoxazine-4,6)-3'-sulfonate are added, the intensity of the sensitization is increased by 50%.

Similar results are obtained if other color couplers of the α-naphthol series or color couplers of other chemical groups such as of the 5-pyrazolone series, for example, 1-(4'-phenoxyphenyl-3'-sulfonic acid) - 3 - stearyl-5-pyrazolone are used.

The following dyes, the preparation of which is described below, are photographically applied in the same manner.

*Example 11*

A dye of the formula:

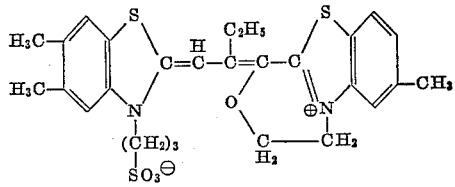

is obtained as follows:

3.9 g. of 2-(β-methylmercapto,β-ethyl-vinyl)-3ω-sulfopropyl-5,6-dimethylbenzthiazolebetain and 3.8 g. of the quaternary salt of Example 2 are heated for 30 minutes at 30° C. in a mixture of 20 ml. of dried ethyl alcohol and 4 ml. of triethylamine with stirring. The dye crystallizes out on cooling and is suction filtered. The precipitate is recrystallized from a 1:1.5 mixture of methanol and chloroform. Yield: 1.05 g. The solution of the dye in methanol is blue, M.P. above 290° C.

*Example 12*

A dye of the formula:

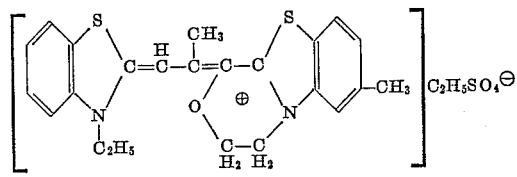

is obtained as follows:

3.6 g. of 2-(β-methyl-β-methylmercapto-vinyl)-3-ethyl-benzthiazoleethylsulfat and 3.8 g. of the quaternary salt of Example 2 are reacted for 1 hour at 20° C. in a mixture of 10 ml. of acetic acid anhydride and 4 ml. of triethylamine with stirring. Yield: 1.1 g. The solution of the dye in methanol is violet-blue, M.P. 269–270° C.

*Example 13*

A dye of the formula:

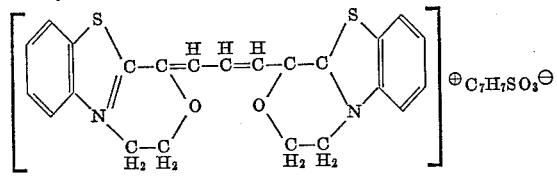

is obtained as follows:

4.2 g. of the quaternary salt of Example 1 and 1.2 g. of trimethindianilid hydrochloride of the formula:

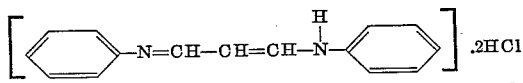

are reacted for 2 hours at 20° C. in a mixture of 50 ml. of acetic acid anhydride and 50 ml. of triethylamine with stirring. The dye crystallizes out and is suction filtered. It is recrystallized from methanol. Yield: 1.3 g. The solution of the dye in methanol is bluish-green; abs. max. 731 mμ; M.P. 279–280° C.

I claim:
1. A photographic silver halide emulsion, containing a sensitizing amount of a cyanine dye selected from those represented by the following formulae:

I

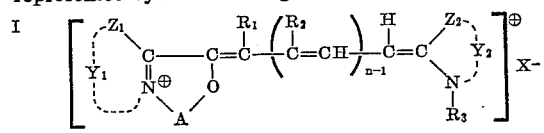

II

III wherein
$R_1$ and $R_2$ each stands for a member of the group consisting of hydrogen and alkyl having up to 3 carbon atoms;
$R_3$ is an alkyl group having up to 5 carbon atoms;
$R_4$ is an alkyl group having up to 5 carbon atoms, substituted by a radical of the group consisting of carboxy and sulfo;
$Z_1$ and $Z_2$ each represent bivalent oxygen, sulfur or selenium;
$Y_1$ and $Y_2$ each represent the non-metallic atoms necessary to complete a heterocyclic ring selected from the group consisting of those of the thiazole series, those of the benzthiazole series, those of the naphthothiazole series, those of the oxazole series, those of the benzoxazole series, those of the naphthooxazole series, those of the selenazole series, those of benzselenazole series and those of the naphthoselenazole series;
A represents a bivalent aliphatic radical having up to 3 carbon atoms;
$n$ is a positive integer from 1 to 3;
X is an anion.

2. A photographic silver halide emulsion containing a sensitizing amount of a cyanine dye of the following formula:

3. A photographic silver halide emulsion containing a sensitizing amount of a cyanine dye of the following formula:

4. A photographic silver halide emulsion containing a sensitizing amount of a cyanine dye of the following formula:

5. A photographic silver halide emulsion containing a sensitizing amount of a cyanine dye of the following formula:

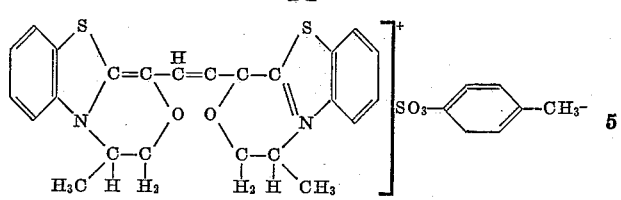

6. A photographic silver emulsion as defined in claim 1 which additionally contains a stabilizing amount of a stabilizer selected from the group of those of the 2-mercapto-naphthooxazole series, those of the 2-mercapto-benzoxazole series, those of the 2-mercapto-benzthiazole series, those of the 2-mercapto-selenazole series, those of the 2-mercapto-benzimidazole series, those of the 2-mercapto-tetrazole series, those of the 2-mercapto-triazole series, those of the 2-mercapto-naphthooxazine series, those of the 2-mercapto-thiodiazole series and those of the 2-mercapto-quinoxaline series.

References Cited

UNITED STATES PATENTS

| | | | |
|---|---|---|---|
| 2,304,981 | 12/1942 | Wilmanns | 96—106 |
| 2,737,516 | 3/1956 | Sartori | 260—304 |
| 2,870,014 | 1/1959 | Brooker et al. | 96—106 |
| 2,895,955 | 7/1959 | Haseltine et al. | 260—240.5 |
| 2,984,664 | 5/1961 | Fry et al. | 260—250.5 |
| 2,996,512 | 8/1961 | Stephens | 260—304 |

J. TRAVIS BROWN, *Primary Examiner.*

NORMAN G. TORCHIN, *Examiner.*